US010006204B1

(12) United States Patent
Robinson

(10) Patent No.: US 10,006,204 B1
(45) Date of Patent: Jun. 26, 2018

(54) ROOF RACKING SYSTEM MOUNT

(71) Applicant: Bamboo Industries LLC, Folsom, CA (US)

(72) Inventor: Chad Robinson, Folsom, CA (US)

(73) Assignee: Zia Mounting Solutions, LLC, Lincoln, CA (US)

( * ) Notice: Subject to any disclaimer, the term of this patent is extended or adjusted under 35 U.S.C. 154(b) by 0 days. days.

(21) Appl. No.: 15/382,166

(22) Filed: Dec. 16, 2016

(51) Int. Cl.
*E04D 1/30* (2006.01)
*E04D 1/34* (2006.01)
*H02S 20/23* (2014.01)

(52) U.S. Cl.
CPC ............... *E04D 1/30* (2013.01); *E04D 1/34* (2013.01); *H02S 20/23* (2014.12); *E04D 2001/308* (2013.01); *E04D 2001/347* (2013.01); *E04D 2001/3467* (2013.01); *E04D 2001/3488* (2013.01)

(58) Field of Classification Search
CPC ....... E04D 1/30; E04D 1/34; E04D 2001/308; E04D 2001/3467; E04D 2001/347; H02S 20/23
See application file for complete search history.

(56) References Cited

U.S. PATENT DOCUMENTS

| 1,978,190 | A | * | 10/1934 | Figge | E04D 1/34 52/543 |
|---|---|---|---|---|---|
| 2,183,008 | A | * | 12/1939 | Camp | E04D 1/34 52/716.1 |
| 2,628,796 | A | | 2/1953 | Krizman | |
| 4,723,128 | A | * | 2/1988 | Gasque, Jr. | H01Q 1/1221 343/878 |
| 7,443,361 | B2 | * | 10/2008 | Haynes | H01Q 1/085 343/878 |
| 7,509,702 | B2 | * | 3/2009 | Cantis | E04G 3/26 14/78 |
| 7,658,356 | B1 | | 2/2010 | Nehls | |
| 7,987,650 | B2 | * | 8/2011 | Pollack | E04D 1/34 52/520 |
| 8,209,914 | B2 | | 7/2012 | Stearns et al. | |
| 8,371,460 | B2 | | 2/2013 | Ghatikar et al. | |
| 8,453,986 | B2 | | 6/2013 | Schnitzer | |
| 8,915,036 | B2 | * | 12/2014 | Vander Laan | E04D 1/34 52/126.1 |
| 9,159,857 | B2 | * | 10/2015 | Kuo | H01L 31/042 |
| 9,175,880 | B2 | * | 11/2015 | Park | F24J 2/5232 |
| 9,219,443 | B2 | | 12/2015 | Shibata et al. | |
| 2002/0174618 | A1 | * | 11/2002 | Carroll | E04D 1/26 52/518 |
| 2003/0101662 | A1 | * | 6/2003 | Ullman | E04D 13/12 52/27 |

(Continued)

*Primary Examiner* — Beth A Stephan
(74) *Attorney, Agent, or Firm* — Lee & Hayes, PLLC

(57) ABSTRACT

A mount including a base portion having a first side and a second side. A plurality of holes are distributed along a lengthwise direction of the base portion and from the first side of the base portion to the second side. A connecting portion extends from the base portion in a direction transverse to a direction of extension of the base portion. A mounting portion extends from the connecting portion. The mounting portion extends in a direction transverse to the direction of extension of the connecting portion such that a portion of the mounting portion is disposed vertically above the base portion. The mounting portion has at least one hole.

19 Claims, 4 Drawing Sheets

(56) References Cited

U.S. PATENT DOCUMENTS

| | | |
|---|---|---|
| 2007/0144105 A1 | 6/2007 | Blanchard |
| 2009/0293383 A1* | 12/2009 | Venter .................... F24J 2/5205 52/173.3 |
| 2010/0083602 A1* | 4/2010 | Pollack .................... E04D 1/34 52/584.1 |
| 2010/0154784 A1 | 6/2010 | King et al. |

* cited by examiner

ROOF RACKING SYSTEM MOUNT

BACKGROUND

Solar panels are becoming increasingly popular to produce electricity. To support solar panels, roof racking systems may be used. Roof racking systems are generally attached to an existing structure of a house or building, such as studs underlying roofing shingles, tiles, and/or plywood. Furthermore, roof racking systems may need to mirror the pre-existing tile or shingle structure of a roof. For instance, tile replacement flashings may be used to mirror a pre-existing tile structure and may be used to support roof racking systems.

Roof racking systems are commonly attached to the roof structure of a house, such as a stud, through the use of mounts. These mounts, which generally have fastener holes, require alignment with the stud so that the roof racking system can be adequately supported, secured, and fastened. However, the studs may be spaced or located such that the installation process becomes complicated. Moreover, the fastener holes may be located below an area on the mount where the roof racking system is attached. Consequently, the user may be inhibited from accurately aligning the fastener holes with the roofing structure, or adequately securing the mount to the house.

Additionally, roof racking systems often include small, loose components, such as nuts and bolts. Roof racking systems may also requirement precise measurement, alignment, and placement of the mounts with the roofing structure. Due to the nature of the roof racking systems, installation frequently occurs in hazardous environments. In such situations, a system that includes small, loose components may cause unnecessary delays and annoyance whenever a loose component is misplaced. Furthermore, a user may struggle with proper alignment of the mount with the roof structure. Such a system may increase the risk to a user's safety, in that the user could lose his/her balance and fall.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the same components on a larger scale or differently shaped for the sake of clarity.

SUMMARY

As briefly discussed above, roof racking systems are frequently used to support solar panels positioned on a roof or other surface receiving sunlight. Using a mount and fasteners, the roof racking systems may be attached to an existing structure of a house or building. The fasteners may be disposed through fastener holes located about the mount.

To ensure proper support of the roof racking system, the fastener holes require alignment with the roof structure, such as a beam, stud, or rafter underlying the roofing substrate. However, in some instances the alignment ends up being such that a raised portion of the mount, which may support the roof racking system, overhangs the fastener holes that are aligned for attachment with the roof structure. When these fastener holes are aligned with the roof structure, it is difficult for a user of a conventional mount to tighten the fasteners due to the obstruction of the raised portion blocking direct, in-line access to turn the fastener into the structure completely. In turn, the fasteners may not be properly secured to the roofing structure.

Accordingly, the present disclosure is directed to a mount that may be used to secure a roof racking system for supporting solar panels or other structures. In some instances, the mount may be a unitary component, including a base portion, a connecting portion, and a mounting portion that extends vertically above the base portion to support and secure the roof racking system. In some instances, a plurality of holes may be included on the base portion via which the mount may be attached to the housing structure, as well as on the mounting portion in order to permit attachment of the roof racking system.

Moreover, while illustrated and described as being useful for attaching solar panels, the mount discussed herein may be used to attach other apparatuses or systems as well.

Furthermore, for convenience, the description of the mount will be discussed herein with respect to being mounted on a roof. However, the specific location of use is understood to not only be limited to a roof.

Additional details regarding the features of the roof racking system are described herein below.

DETAILED DESCRIPTION

Figure 1:
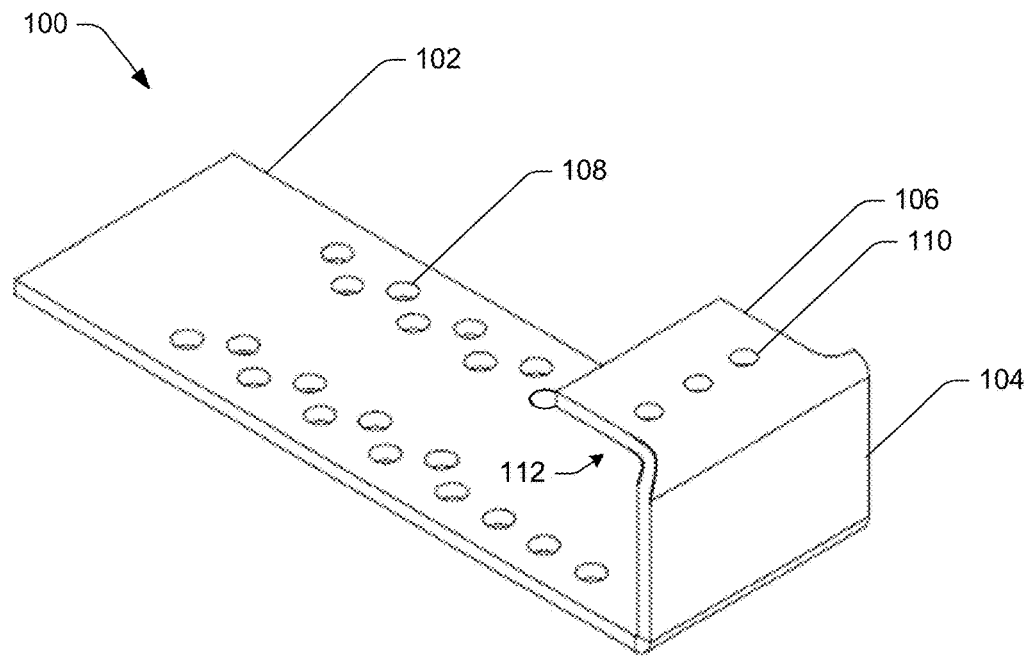
FIG. 1 illustrates a perspective view of a mount of a roof racking system according to an embodiment of the application.

FIG. 1 depicts a perspective view of a mount 100 for use in a roof racking system according to an embodiment of the instant application. In general, mount 100 may be placed adjacent to a surface on which the roof racking system is to be applied and secured to the surface thereof via a fastener (not shown) traversing through mount 100. Fasteners used to attach mount 100 may include, for example, bolts, screws, etc. Furthermore, mount 100 may be mounted to any of a plurality of varying surfaces, such as those used in roofing applications, for example, and may be positioned below the shingle level and directly on top of the roofing substrate. Surface materials may include plywood, tile flashing, metal/tin roofing sheets, vinyl, etc.

Referring to the specifics of FIG. 1, mount 100 may include a base portion 102, a connecting portion 104, and a mounting portion 106. As shown, base portion 102 may extend from an end or portion of connecting portion 104. In some instances, base portion 102 may extend perpendicularly from connecting portion 104. Mounting portion 106 may extend from an end or portion of an opposite end of connecting portion 104, and may or may not be in contact with base portion 102. In some instances, as illustrated, mount 100 may have a hook-shape configuration. However, other shapes may also be instituted. In addition, base portion 102, connecting portion 104, and mounting portion 106 may be of similar or different thicknesses with respect to one another.

Base portion 102 may have a plurality of holes 108 distributed along a lengthwise direction of base portion 102. The plurality of holes 108 may be in any pattern, or alternatively, may be randomly placed throughout base portion 102. Furthermore, as shown, the plurality of holes 108 may be offset from an edge or perimeter for base portion 102. However, in some instances, the plurality of holes 108 may have a staggered configuration to permit adjacent holes of the plurality of holes 108 to be disposed above the roofing structure, while allowing mount 100 to be aligned with the roof racking system.

When in use, base portion 102 may be attached to the roofing substrate (not shown) to support a solar panel or other apparatus. Mount 100 may be attached such that the longest dimension of mount 100 extends perpendicularly, at an angle, or parallel to the direction of the slope of the roof to which mount 100 is attached. The length of base portion 102, as well as the plurality of holes 108, may allow for improved adjustability by providing a plurality of mounting locations of mount 100 to adapt to the varying distances between the suitable mounting positions of the roofing structure.

Due to the variability in the exact location of the mounting supports with respect to the disposition of the roof racking system during installation, the plurality of holes 108 are placed about base portion 102, and are arranged and provided to allow a user to align at least a portion of the plurality of holes 108 with the roofing structure. That is, not all of the plurality of holes 108 will align with the roofing structure, and thus, not all of the plurality of holes may be used. However, once aligned, a fastener is used to pass through the holes aligned with the roofing structure and to connect the mount 100 to the roofing structure. Thus, through the configuration of the plurality of holes 108, the user is able to secure the mount to the roofing structure easily despite the variability of the roofing structure.

Connecting portion 104 extends transversely from an end of base portion 102. In an embodiment, as shown in FIG. 1, connecting portion 104 may be a same width as base portion 102. Alternatively, in some instances (not shown), connecting portion 104 may be of smaller width than base portion 102. That is, connecting portion 104 may taper (not shown), from the point at which connecting member 104 extends from base portion 102 to a point at which mounting portion 106 extends from connecting member 104. Alternatively, the taper may begin and end anywhere between base portion 102 and mounting portion 106.

Connecting portion 104 may extend in various lengths transverse to base portion 102. For instance, depending on the roof racking system implemented, for which the shape or thickness of a tile replacement flashing varies, connecting portion 104 may extend at different lengths. More particularly, the tile replacement flashing may be flat, "S" shaped, or "W" shaped. Accordingly, a flat tile replacement flashing may not need to be elevated as much above base portion 102 as compared to a "W" shaped tile replacement flashing. That is, when implementing a "W" shaped tile replacement flashing, the outline of the flashing may traverse below a portion or a plane of mounting portion 106. Accordingly, the tile replacement flashing may need to be elevated more or less above base portion 102 so as to allow the tile replacement flashing to properly attach to mounting portion 106. The different offset distances from base portion 102 to mounting portion 106 may position mounting portion 106 at an appropriate height above base portion 102 such that the mounting portion 106 comes into a flush relationship with an underside of the roof racking system. In addition, the various lengths of connecting portion 104 may assist in matching a pre-existing configuration of a roof.

Mounting portion 106 may extend from an opposite the end of connecting portion 104 from which base portion 102 extends. In some instances, mounting portion 106 may extend approximately perpendicularly from connecting member 104. As previously mentioned, mounting portion 106 may be configured to support and secure a roof racking system. As shown, mounting portion 106 may extend over a surface or area of base portion 102 so as to support and secure the roof racking system, thereby forming the hook-shape mentioned earlier. Mounting portion 106 includes one or more holes 110 therethrough to support and secure the roof racking system through the use of a fastener (discussed in FIG. 4). In addition, holes 110 may be threaded so as to permit attachment of the fastener.

While in some instances only one hole of the one or more holes 110 may have a fastener disposed therethrough to support the roof racking system, the inclusion of multiple holes 110 provides a user greater adjustability when installing the roof racking system. The unthreaded holes in a conventional mount typically require a nut or other secondary means to secure the fastener. In contrast, in an embodiment of the instant application where holes 110 are threaded, mount 100 may simplify the installation process of a roof racking system such that no nut or other fastener is required to be tac-welded or held in place on an underside of mounting portion 106.

As stated above, mounting portion 106 may extend over a surface or area of base portion 102. However, to prevent mounting portion 106 from interfering or inhibiting the placement and securing of fasteners through the plurality of holes 108, mounting portion 106 may taper inward (shown by reference numeral 112) in a direction away from connecting portion 104. Taper 112 may begin at or near a point where mounting portion 106 extends from connecting portion 104. Accordingly, at least a section of mounting portion 106 may have a smaller width than the respective widths of base portion 102 and/or connecting portion 104. Moreover, while taper 112 is shown as having a particular profile, the profile of taper 112 may vary from that depicted. For instance, taper 112 may extend linearly or parabolically from a first end (near a point or at a point of connection with connecting portion 104) to a second, opposite end.

Furthermore, in an alternative embodiment not shown, mounting portion 106 may not include taper 112. Rather, an entirety of mounting portion 106 may be of a smaller width than base portion 102 and/or connecting portion 104 such that the plurality of holes 108 are not obscured by mounting portion 106.

Compared to conventional mounts used to support roof racking systems, the inclusion of taper 112 may provide additional versatility to mount 100 and thus may be more useful in a variety of additional applications. More specifically, the location of mount 100 on a roof, may, in some instances, be determined by the roofing structure and mounting holes located on the roof racking system. However, as discussed, holes located on conventional mounts to secure the mount to the roofing structure may be positioned directly below where the roof racking system is to be attached and/or supported (e.g. mounting portion 106). As such, conventional mounts may be aligned in use such that holes needed to secure the mount are less accessible due to their location underneath an area used to support the roof racking system. When such holes are used due to their alignment with the studs of the roofing structure, the conventional mount may be inadequately secured to the roofing structure.

Turning back to the instant application, mount 100 may be implemented with a plurality of mounts 100 across a roofing structure. When multiple mounts 100 are implemented, mounts 100 may be separated by a distance that corresponds to a plurality of factors. For instance, when the roof racking system includes a rail structure, the placement of mounts 100 may be limited by the span of the rail. The span between mounts may also be limited by potential snow loads or the weight of the attached solar panels or other devices. Moreover, the span may correspond to the structure or shape of a tile replacement flashing. Accordingly, mounts 100 may be implemented in a variety of configurations across a roof or other surfaces.

Mount 100 may be formed of metal, plastic, or any other suitable material. For instance, mount 100 may be manufactured from type 304 stainless steel. Though generally heavier than aluminum, compared to conventional mounts made from aluminum, in instances where mount 100 is manufactured from stainless steel, mount 100 may better withstand the impact and driving forces exerted by a variety of tools. For instance, such material may allow for the fasteners to attached to mounting portion 106, via holes 110, through the use of air-compressed or electrical tools more effectively. Moreover, when manufactured from steel, the structural integrity of mount 100 is increased, thus providing the ability to increase the number of holes 108 positioned throughout base portion 102. As such, the additional number of holes 108 improves the ease in aligning mount 100 with the roofing structure. In addition, in an embodiment where mount 100 is manufactured from stainless steel, mount 100 may be capable of withstanding increased loads.

Nevertheless, in an embodiment, mount 100 may be manufactured from other metals, metal alloys, or materials, including, aluminum, brass, copper, zinc, lead, etc.

As indicated, mount 100 may be formed as a single structure from a unitary piece of material. For instance, mount 100 may be stamped and then bent into shape to achieve the described configuration. However, it is contemplated that base portion 102, connecting portion 104, and mounting portion 106 may be formed from distinct pieces of material and thereafter connected or attached to one another.

In some instances, to prevent water or other moisture from wicking through the plurality of holes 108, or alternatively, the fastener hole created by the fastener, silicon caulking or rubber seals may be applied to an area of mount 100. Accordingly, mount 100 may be used without diminishing the water shedding abilities of the original roofing structure and may prevent water damage to the roofing or housing structure.

Figure 2:
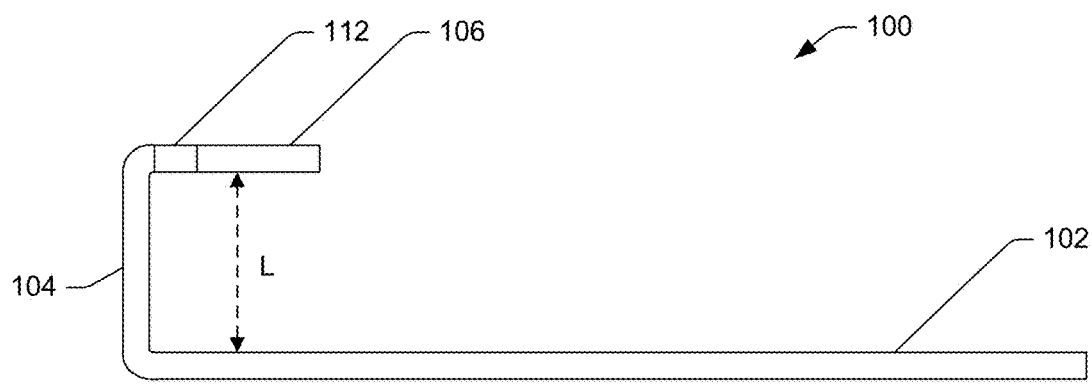
FIG. 2 illustrates a side view of the mount of FIG. 1 according to an embodiment of the application.

Referring to FIG. 2, a side view of mount 100 of FIG. 1 is shown. As discussed in detail with respect to FIG. 1, mounting portion 106 may overhang or be positioned vertically above base portion 102 so as to permit a roof racking system to be mounted thereto or attached. Moreover, to allow different roof racking systems to be used, a length (L) of connecting portion 104 or offset distance between base portion 102 and mounting portion 106 may be varied.

Figure 3:
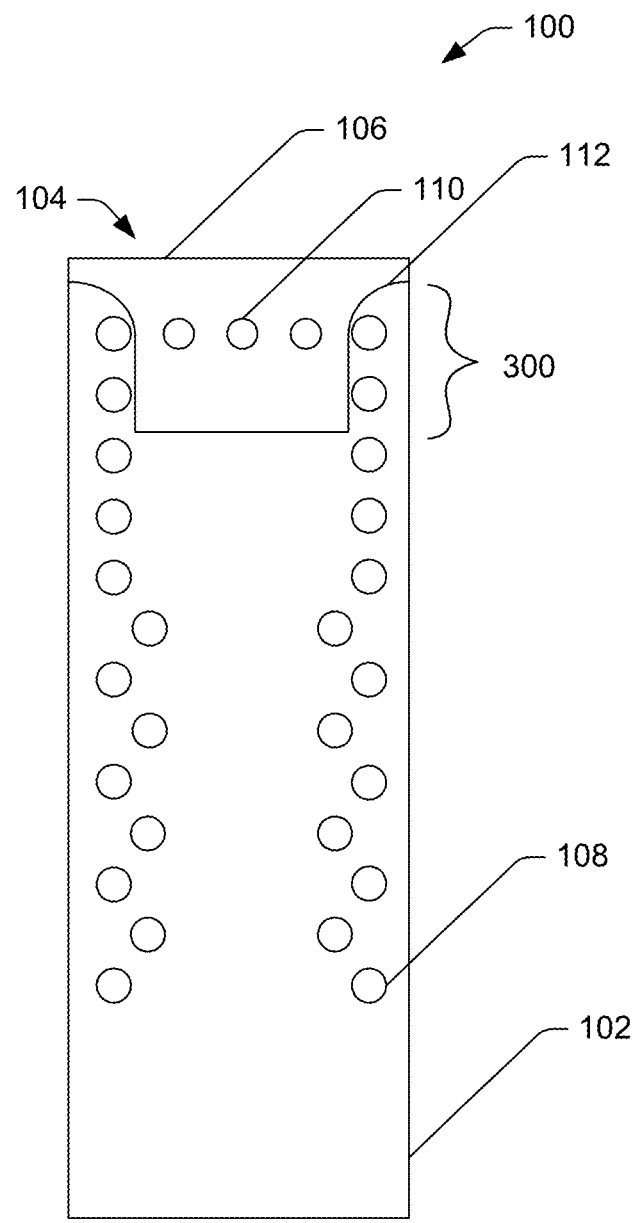
FIG. 3 illustrates a top view of the mount of FIG. 1 according to an embodiment of the application.

FIG. 3 illustrates a top view of mount 100 of FIG. 1. When securing mount 100 to a roofing structure, holes on the mount require alignment with the roofing structure. That is, to properly secure and support the roof racking system, fasteners may be driven through the mount and into studs located beneath the roofing substrate. Accordingly, the fasteners may require placement through holes disposed vertically above the studs. However, as discussed above, in conventional mounts, the holes that the fasteners are to be disposed through may be inhibited from being accessed due to an overhang or overlap of the mount. In such a situation, the user might attach the mount so that it is not fastened into studs or the attachment to the studs, the structural integrity of the roof racking system may be compromised.

Thus, in some instances, to alleviate and address this situation, taper 112 of mounting portion 106 may be configured as shown in FIG. 3 to provide direct exposure to a portion of the plurality of holes 108 that would otherwise be inaccessible or difficult to access without taper 112. More particularly, holes 300 represent respective holes of the plurality of holes 108 that are directly accessible due to taper 112. Accordingly, when holes 114 align with the studs underlying the roofing structure, holes 114 may be properly and adequately used to secure mount 100 to the roofing structure. Compared to conventional mounts that block access, a user may therefore be able to properly and more easily drive a fastener into one or more of holes 300, and mount 100 may be properly fastened to the roofing structure.

Figure 4:
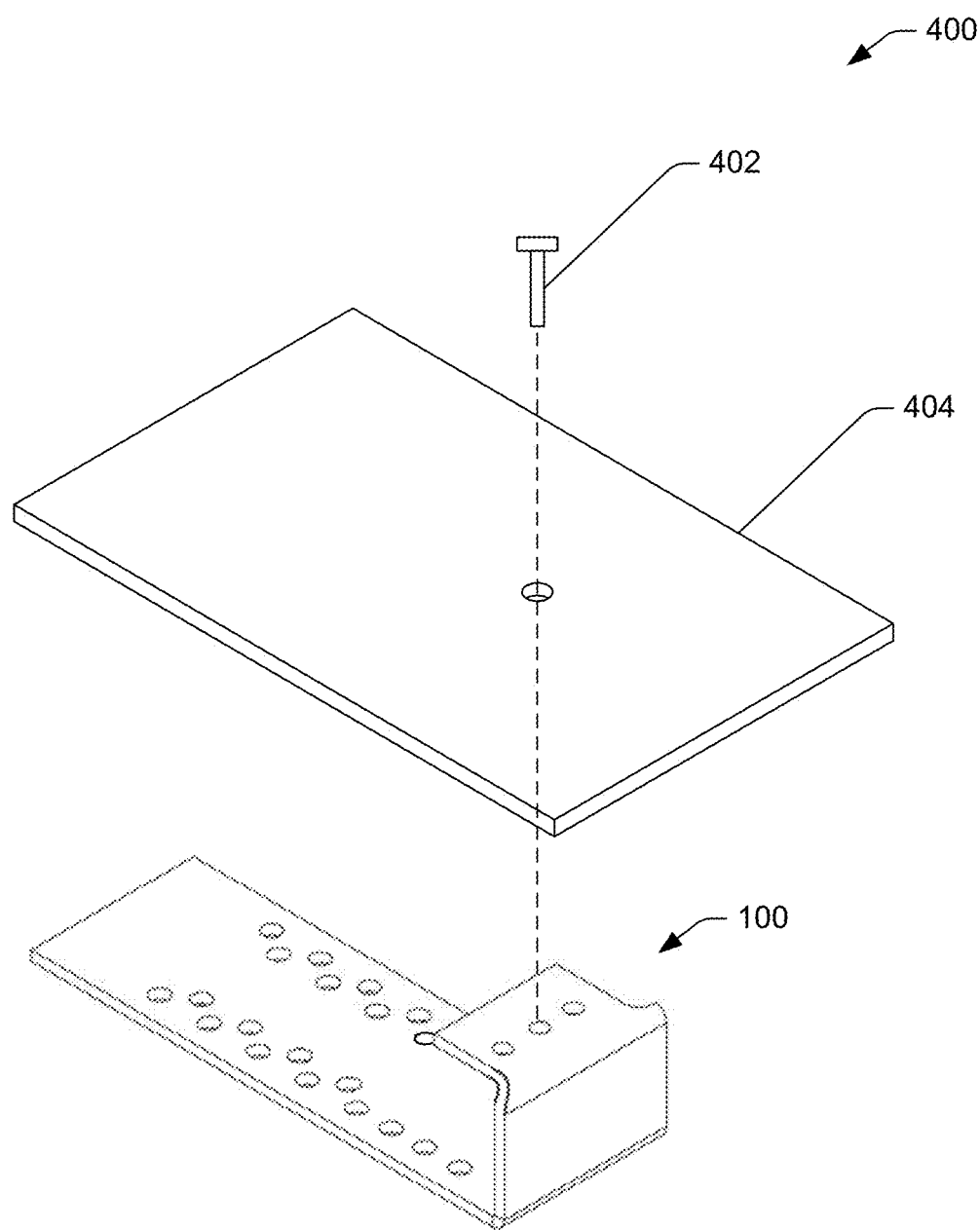
FIG. 4 illustrates a perspective view of the mount of FIG. 1 as used with a tile replacement flashing of a roof racking system according to an embodiment of the application.

FIG. 4 illustrates an exploded view 400 showing mount 100 as used with a roof racking system. More specifically, FIG. 4 details a fastener 402 disposed through a tile replacement flashing 404 of a roof racking system and being secured to mount 100. Note that while tile replacement flashing 404 is shown as being flat, other configurations may be implemented, such as those previously discussed. Moreover, additional components, in addition to, or in lieu of fastener 402, may be used. Furthermore, roof racking system may include other components in addition or alternatively to the roof replacement flashing 404.

As shown, and with reference to FIGS. 1-3, mounting portion 106 may be used to support the tile replacement flashing 404. Connecting portion 104 of mount 100 permits tile replacement flashing 404 to be elevated above base portion 102, such that tile replacement flashing 104 may match an existing configuration of a roof, or alternatively, to permit different configurations of roof racking systems to be implemented.

Figure 5:
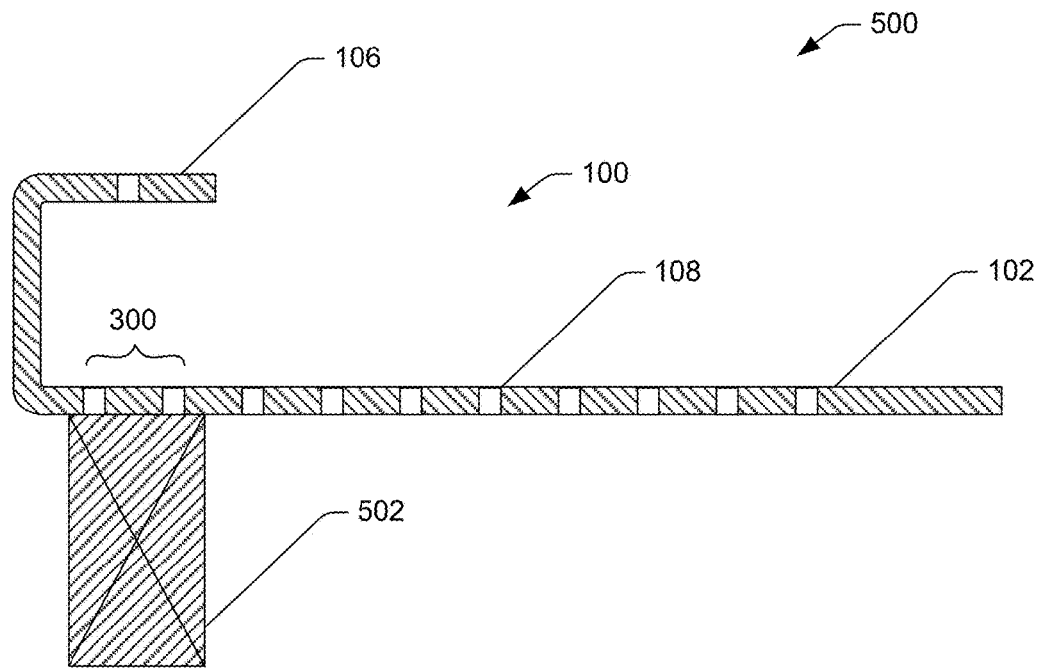
FIG. 5 illustrates a cross-sectional side view of the mount of FIG. 1 according to an embodiment of the application.

FIG. 5 illustrates a cross-sectional side view 500 of mount 100 as implemented according to an embodiment of the instant application. As discussed previously, one or more holes 300 of the plurality of holes 108 located on base portion 102 may be located underneath an area of mounting portion 106. Accordingly, a taper may allow holes 300 to be accessed such that fasteners can pass therethrough and into stud 500. Note, only stud 502 has been shown for convenience. However, it is understood that other materials of the roofing structure or substrate, such as a plywood, may be disposed in between mount 100 and stud 116. In addition, while FIG. 5 shows mount 100 positioned at a given orientation with respect to stud 116 (or alternatively a roof substrate), mount 100 may be aligned with stud 116 at other directions, such as extending parallel or at an angle relative thereto.

Figure 6:
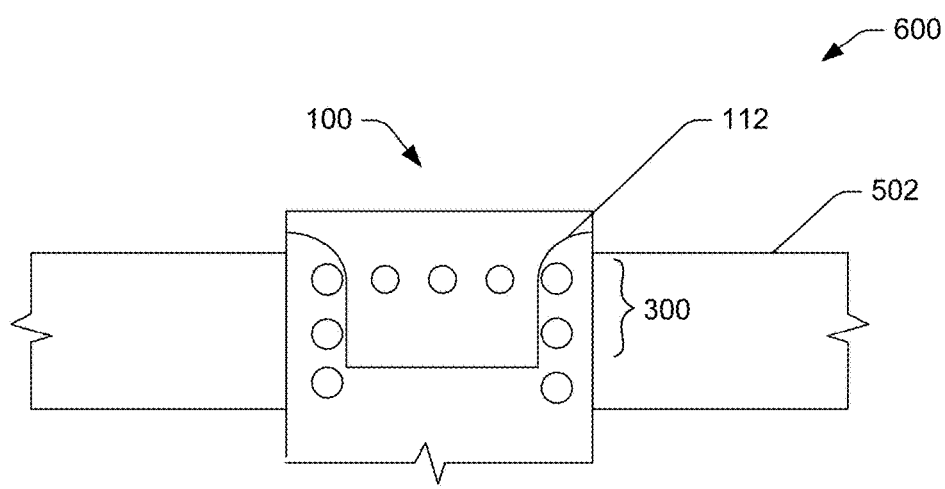
FIG. 6 illustrates a partial top view of an implementation of the mount of FIG. 1 according to an embodiment of the application.

FIG. 6 illustrates a partial top view 600 of mount 100 as illustrated in FIG. 5. As shown, mount 100 may be disposed vertically above a stud 502 in which the mount 100 is to be secured. Holes 300 are exposed through the inclusion of taper 112 of mounting portion 106. Correspondingly, when stud 502 is located beneath holes 300, which align with the roofing structure, mount 100 may be more easily secured.

CONCLUSION

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. A mount, comprising:
a base portion having:
a length extending between a first end and a second end,
a first side and a second side, and
a plurality of holes distributed along a lengthwise direction of the base portion, extending therethrough from the first side to the second side;
a connecting portion extending from the base portion in a direction transverse to a direction of extension of the base portion; and
a mounting portion extending from the connecting portion, the mounting portion having at least one hole therethrough, and the mounting portion extending in a direction transverse to the direction of extension of the connecting portion such that the mounting portion is disposed vertically above the base portion,
wherein the mounting portion extends less than halfway across the length of the base portion and tapers inward.

2. The mount according to claim 1, wherein the connecting portion extends perpendicularly to the base portion.

3. The mount according to claim 1, wherein the mounting portion extends approximately perpendicularly to the connecting portion.

4. The mount according to claim 1, wherein the at least one hole of the mounting portion is threaded.

5. The mount according to claim 1, wherein a material of the mount includes 304 stainless steel.

6. The mount according to claim 1, wherein the mounting portion tapers inward from an end of the connecting portion.

7. The mount according to claim 6, wherein the plurality of holes of the base portion are not vertically obstructed by the mounting portion.

8. A mount, comprising:
a base portion having:
a first surface and a second surface,
a first end and a second end,
a plurality of holes extending between the first and the second surface, the plurality of holes distributed along a lengthwise direction of the base portion between the first and second end, the plurality of holes being offset from a perimeter of the base portion;
a connecting portion having a first end and a second end, the first end of the connecting portion being connected to the second end of the base portion and extending in a direction transverse to the base portion; and
a mounting portion having:
a first surface and a second surface,
a first end and a second end, the second end of the mounting portion being connected to the second end of the connecting portion, a width of the mounting portion tapering inward from the second end of the mounting portion to the first end of the mounting portion, and
at least one hole extending between the first surface of the mounting portion and the second surface of the mounting portion.

9. The mount of claim 8, wherein at least a portion of the mounting portion overhangs the first surface of the base portion.

10. The mount of claim 8, wherein the first surface of the base portion and the first surface of the mounting portion are substantially parallel.

11. The mount of claim 8, wherein the at least one hole of the mounting portion is threaded.

12. The mount of claim 8, wherein a material of the mount includes steel.

13. The mount of claim 8, wherein a width of the mounting portion is smaller than a width of the base portion.

14. The mount of claim 13, wherein the plurality of holes of the base portion are not vertically obstructed by the mounting portion.

15. A mount system, comprising:
a flashing including at least one hole;
a mount including:
a base portion having a plurality of holes,
a mounting portion having at least one hole, the mounting portion being connected to the base portion via a connecting portion, at least a portion of the mounting portion disposed vertically above the base portion, and the mounting portion tapering inward from the connecting portion to a distal end of the mounting portion such that the mounting portion does not vertically obstruct at least one hole of the plurality of holes of the base portion; and
a fastener configured to be disposed through the at least one hole of the flashing and the at least one hole of the mounting portion.

16. The system according to claim 15, wherein the mounting portion and the base portion are substantially parallel.

17. The system according to claim 15, wherein the at least one hole of the mounting portion is threaded, and
wherein the fastener is disposed through the flashing and engages with the at least one threaded hole of the mounting portion.

18. The system according to claim 15, wherein the mount comprises 304 stainless steel.

19. The system according to claim 15, wherein the base portion, connecting portion, and mounting portion are formed from a single piece of material.

* * * * *